Patented Aug. 18, 1931

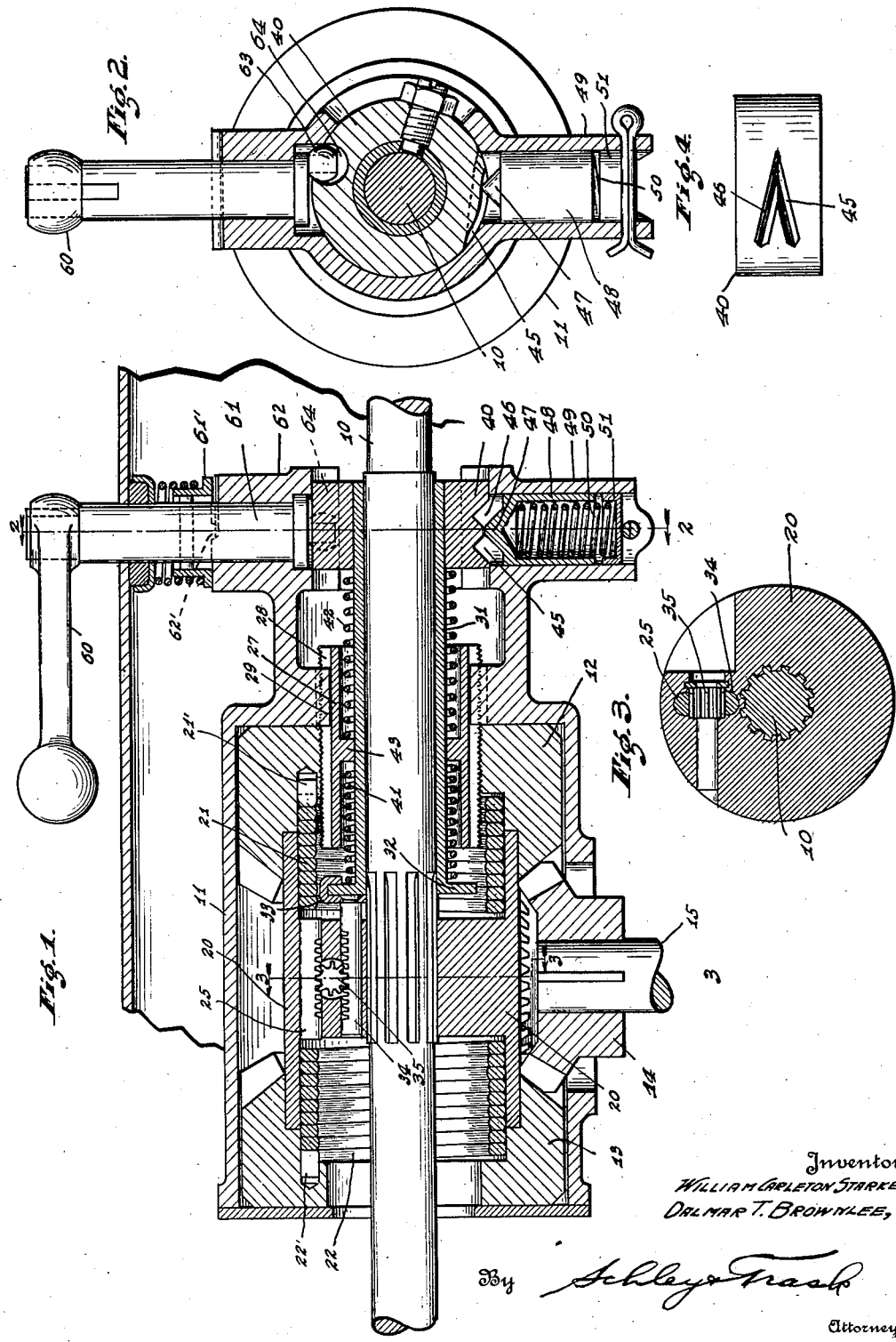

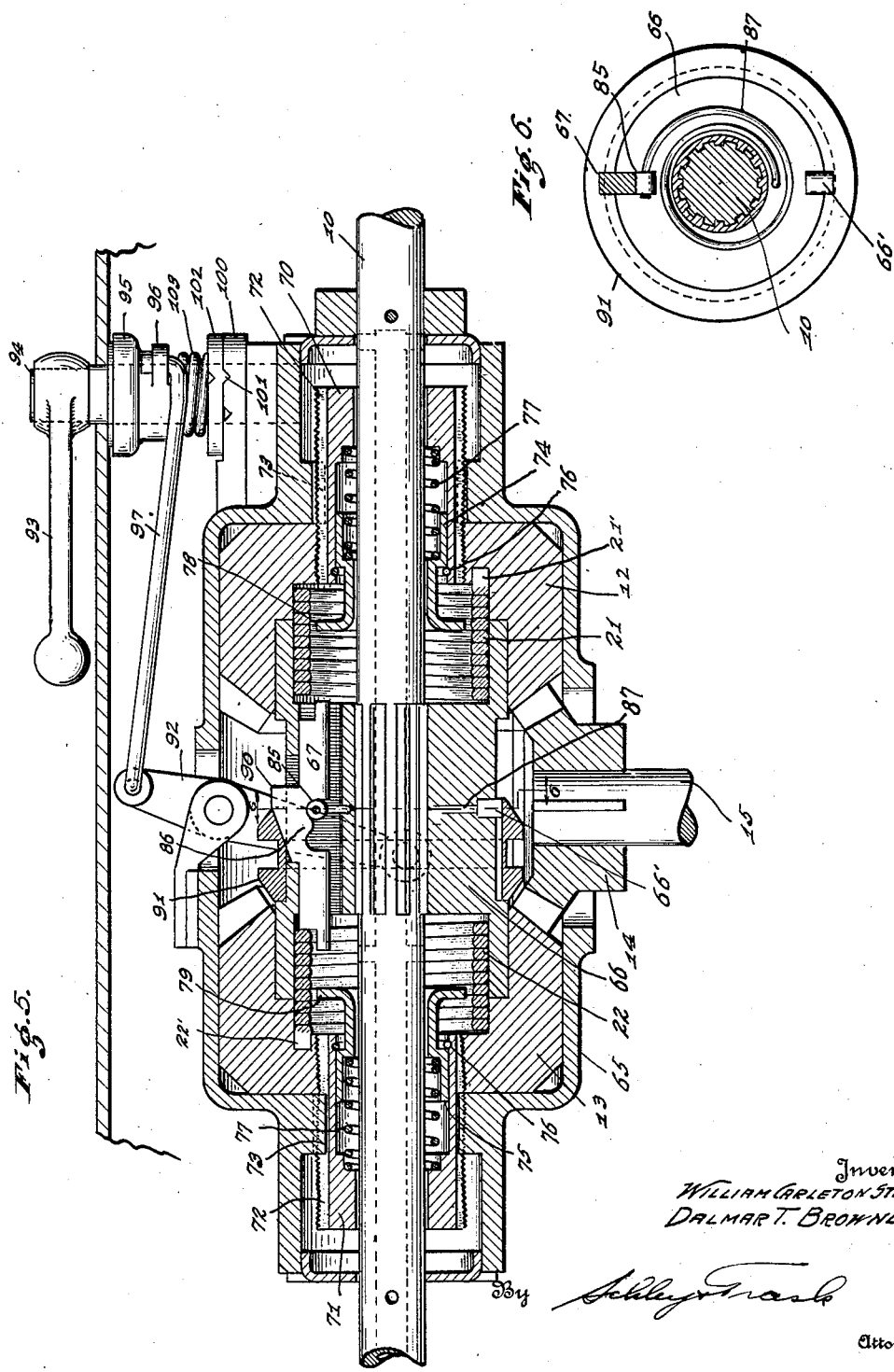

1,819,306

UNITED STATES PATENT OFFICE

WILLIAM CARLETON STARKEY AND DALMAR TEMPLETON BROWNLEE, OF INDIANAPOLIS, INDIANA, ASSIGNORS TO L. G. S. DEVICES CORPORATION, OF INDIANAPOLIS, INDIANA, A CORPORATION OF INDIANA

REVERSING DRIVE

Application filed June 13, 1927. Serial No. 198,439.

It is the object of our invention to produce a reversing drive by which a driven shaft may be driven alternately in opposite directions from a driving shaft which rotates constantly in one direction. More specifically, it is our object to produce such a drive in which the moving parts which move to cause reversal of the driven shaft may be light in weight and need not be strong enough to carry the complete torque being transmitted from the driving to the driven shaft.

We accomplish the above objects by providing the driving shaft with a clutch member capable of being clutched to either of two rotatable parts which when operative serve to rotate the driven shaft respectively in opposite directions. In the most desirable form of our invention, the driving clutch member is provided in opposite ends with axial recesses which receive coil springs connected respectively to the driven clutch members, each of such springs being normally of slightly smaller diameter than the recess in the driving clutch member; and we provide a means capable of engagement with either of such springs for imparting a torque thereto, such torque causing the spring to unwind slightly, to increase in diameter, and to grip the wall of its associated recess. We provide mechanism for periodically disconnecting this spring-actuating means from one spring and for connecting it with the other.

The accompanying drawings illustrate our invention: Fig. 1 is a longitudinal section through one form of reversing drive; Figs. 2 and 3 are transverse sections respectively on the lines 2—2 and 3—3 respectively of Fig. 1; Fig. 4 is an elevation of the control collar; Fig. 5 is a longitudinal section through the modified form of the reversing drive; and Fig. 6 is a section on the line 6—6 of Fig. 5.

In the form of our invention illustrated in Figs. 1, 2, and 3, there is a driving shaft 10 which passes into a housing 11, such housing serving as an enclosure for the parts of our drive. Rotatably supported within this housing and co-axial with the driving shaft 10 are two oppositely disposed bevel gears 12 and 13 both of which mesh with a pinion 14 carried by the driven shaft 15.

Rotatable with the shaft 10 and located between the gears 12 and 13 is a driving clutch member 20 provided in its ends with axial recesses in which are received coil springs 21 and 22 operatively connected respectively to the gears 12 and 13. Desirably, the adjacent faces of the gears 12 and 13 are provided with counter-bored recesses, the larger-diameter portions of which receive the ends of the clutch member 20 and the smaller diameter-portions of which form substantially continuous cylindrical surfaces with the walls of the recesses in the ends of the clutch member 20.

At the bottom of the recesses in the gears 12 and 13, there may be provided holes or depressions for receiving the outbent ends 21' and 22' of the springs 21 and 22 respectively in order that each of such springs will rotate with its associated gear. The springs 21 and 22 are normally slightly smaller than the recesses in which they are located in order that they normally will not interfere with relative rotation to the gears and clutch member.

Mounted in the clutch member 20 is an axially slidable member, conveniently in the form of a pin 25, which may be moved into and out of engagement with the free end of either of the springs 21 and 22. The pin 25 is of such a length that it will be out of engagement with one spring-end while it is engaged with the other spring-end.

Since the springs 21 and 22 are located on opposite sides of the clutch member 20 which always rotates in the same direction, oppositely directed torques are imposed on the springs whenever they are engaged by the pin 25. As it is desired, in the form of clutch shown, that this torque increase the diameter of the clutch springs, the two springs are of opposite hand. Assuming the shaft 10 to run in a counter-clockwise direction (Fig. 2), the spring 21 will be a right-hand spring and the spring 22 a left-hand spring.

From the construction so far described, it will be evident that when the pin 25, which is shown in Fig. 1 as in its neutral position, is moved into engagement with the end of one of the clutch springs, that clutch spring will operate to clutch its associated gear to the clutch member 20, thus causing such gear to rotate with the shaft 10. The other gear, since it is driven through the pinion 14, will rotate in a direction opposite to that in which the shaft 10 is rotated. Assuming the pin 25 to be moved to the right (Fig. 1) into engagement with the end of the spring 21, rotation of the shaft 10 and clutch member 20 will impose a torque on the spring 21, such torque operating to cause the spring to unwind slightly and to expand into firm frictional engagement with the walls of the recesses in the clutch member 20 and gear 12. The gear 12 will now rotate with the shaft 10 and, through the pinion 14, will drive the gear 13 in the opposite direction. If the pin 25 is now moved out of engagement with the end of the spring 21 and into engagement with the end of the spring 22, the gear 13 will rotate with the shaft 10 and will drive the pinion 14 in the opposite direction to that in which it was driven by the gear 12. Removal of the pin 25 from engagement with the end of the spring 21 permits such spring to assume its normal diameter and to free the gear 12 from its connection to the shaft 10. In this situation the gear 12, being driven from the pinion 14, rotates in the opposite direction to the shaft 10.

It will be evident that the pin 25, if caused to move periodically out of engagement with one of the clutch springs 21 and 22 and into engagement with the other, will cause a periodic reversal of the direction of rotation of the driven shaft 15 as well as of the direction of the two gears 12 and 13. The periodic reversal of the direction of rotation of either of the gears 12 and 13 may be employed to effect the periodic shifting of the pin 25.

To this end, we provide one of the gears, here shown as the gear 12, with an axial screw-threaded hole for the reception of a screw-threaded collar 27. Some means is provided for preventing rotation of the collar 27, one method of accomplishing this result being to provide in the outer surface of the collar 27 one or more longitudinally extending grooves 28 which receive keys 29 integral or rigid with the housing 11 through the wall of which the collar passes.

Located within the collar 27 and slidable relatively to the shaft 10 and collar 27 is a sleeve 31 having on its inner end a flange 32. This flange is connected, as by means of a finger 33, with a pin 34 which is slidably mounted in the clutch member 20. Desirably the two pins 25 and 34 are located in the same radial plane, are provided on their adjacent faces with rack teeth, and are interconnected as by means of a pinion 35, so that movement of the pin 34 in one direction will produce movement of the pin 25 in the opposite direction.

Near the outer end of the sleeve 31 we provide a collar 40 which is rigidly connected to such sleeve. Acting between the collar 27 and the flange 32 is a coiled compression spring 41, a similar spring 42 acting between the collar 27 and the collar 40. Preferably, the collar 20 is counterbored at its opposite ends to leave near its center an inwardly projecting flange 43 against which the ends of the springs 41 and 42 abut.

In the circumferential face of the collar 40 we provide two axially spaced V-shaped grooves 45 and 46 into either of which may enter the tooth 47 of a latch 48 which is radially slidable in a suitable guide 49. A compression spring 50, acting between the latch 48 and a suitable abutment 51, tends to force the latch radially inward to hold the tooth 47 seated in either of the grooves 45 and 46, thus tending to prevent axial movement of the collar 40 and the sleeve 31 which is rigid with it.

In Fig. 1 of the drawings, the parts of the drive are shown in the positions they occupy when the drive is reversing. Under these conditions the clutch-actuating pin 25 is not in engagement with either the clutch spring 21 or the clutch spring 22, both clutch springs are therefore inoperative, and the shaft 10 may rotate without causing rotation of either of the gears 12 and 13. In the operation of the drive, the parts thereof never remain in this position unless they are held there by control means to be described later. In actual operation, the parts never remain in this position; for the force exerted by the springs 41 and 42 on the sleeve 31 will not permit the tooth 47 to remain on the land between the grooves 45 and 46.

As shown in Fig. 1, the spring 41 is compressed to a greater extent than the spring 42, and thus tends to produce a movement of the sleeve 31 to the left to cause the latch tooth 47 to drop into the groove 46 in the collar 40. This movement of the sleeve 31 would cause a movement of the pin 34 to the left and a corresponding movement of the pin 25 to the right causing it to engage the end of the spring 21. This action results in clutching the gear 12 to the shaft 10 causing such gear to rotate with such shaft. As a result of this rotation of the gear 12, the collar 27 is moved outward or toward the right (Fig. 3) by the action of the screw threads. This movement of the collar 27 permits expansion of the spring 41 and gradually increases the compression of the spring 42 tending to cause the sleeve 31 to move to the right. Movement of the sleeve 31 to the right is opposed by the spring 50 which is holding the tooth 47 in the groove 46. After continued operation of the device, the threaded collar 27 engages the collar 40 and positively moves it and the sleeve 31 to the right. In the movement of the collar 27 to the right, the spring 42 has become compressed although not to a point sufficient to move the collar 40 against the pressure of the spring 50. When the collar 27 moves the collar 40 to the right and forces the latch-tooth 47 out of the groove 46, the force exerted on the collar 40 by the compressed spring 42 moves such collar further to the right until the latch-tooth 47 enters the groove 45.

This movement of the sleeve 31 results in the movement of the pin 25 out of engagement with the end of the spring 21 and into engagement with the end of the spring 22, thus operating to free the gear 12 from the shaft 10 and to clutch the gear 13 to such shaft. After this operation has occurred, the shaft 15 is reversed and the gear 12, being driven from the gear 13 through the gear 14, is rotating in a direction opposite to that in which it rotated while clutched to the shaft 10. Rotation of the gear 12 in this direction causes the collar 27 to move to the left by the action of the screw thread. This movement of the collar 27 decreases the force which the spring 42 exerts on the collar 40 and compresses the spring 41. Eventually, the collar 27 engages the flange 32, moves it to the left, and forces the latch 47 out of the groove 45. The compressed spring 41 moves the collar 40 and sleeve 31 further to the left until the tooth 47 enters the groove 46. This movement of the sleeve 31 causes the pin 25 to move out of engagement with the spring 22 and into engagement with the spring 21, thus effecting a reversal in the direction of rotation of the shaft 15.

Desirably some means is provided for effecting a manual control of the drive in order that it may be stopped or started at will. To this end, we may provide a control lever 60 carried by a shaft 61 which is rotatably supported in an extension 62 of the housing 11. This shaft 61 is located in the approximate plane of the collar 41 and is provided on its inner end with a spherical boss 63 which is received within a longitudinal groove 64 in the circumferential face of the collar 40. By operating the handle 60, the shaft 61 may be rotated to move the sleeve 31 on the shaft 10. The movement of the sleeve 31 thus effected is a combined longitudinal and circumferential movement owing to engagement of the latch 47 with one or the other of the grooves 45 and 46. The circumferential movement of the sleeve 31 is without effect on the clutch-controlling mechanism, but the longitudinal movement thereof is transferred to the spring-actuating pin 25 to move such pin to neutral position or into engagement with either of the springs 21 and 22, as may be desired.

If desired, we may provide the shaft 61 with a collar 61' which is rotatable therewith but slidable thereon. This collar 61' may be provided with a lug 62' adapted to enter grooves in the end face of the housing-extension 62. The collar 61' is conveniently spring-pressed against the end of the extension 62 in order that the lug 62' may cooperate with the grooves to hold the handle 60 in either of its controlling positions.

In the modification of our invention illustrated in Fig. 5, the same driving shaft 10, gears 12 and 13, pinion 14, and driven shaft 15, as shown in Figs. 1 to 4 inclusive are employed. The gears 12 and 13 and pinion 14 may be enclosed within a suitable casing 65 which protects the parts of the drive.

Within the casing 65, there is rigidly mounted on the shaft 10 a clutch member 66 which is in general similar to the clutch member 20 illustrated in connection with the construction shown in Figs. 1 to 3 inclusive. The clutch member 66 is provided in its ends with recesses for the reception of the coil springs 21 and 22 which are connected respectively to the gears 12 and 13. This construction, as so far described, is in general similar to that illustrated in Figs. 1 to 4. In the modification of my invention shown in Fig. 5, however, a different spring-actuating means is employed and a different means for controlling reversal is incorporated.

The spring-actuating means illustrated in Fig. 5 comprises a key 67 which is slidably mounted on the clutch member 66 for both axial and radial movement. In the position shown in Fig. 5, the key 67 is in engagement with the spring 22. The key may be moved axially from this position out of engagement with the spring 22 and into engagement with the spring 21; or, if it is desired to render the drive inoperative, the key 67 may be moved radially inward so that it will engage neither the spring 21 nor the spring 22.

For the purpose of shifting the key 67 axially to produce periodic reversal of the drive we mount in screw-threads in the gear 12 a collar 70 and in screw threads in the gear 13 a second collar 71. Each of these collars 70 and 71 is provided with one or more longitudinally extending grooves 72 which receive keys 73 rigid or integral with the housing 65, through the wall of which the collars pass.

Since the sleeves 70 are prevented from rotating, they will be moved axially by the action of the screw threads by which they are associated with their respective gears, when such gears rotate. The screw threads on the two collars are of opposite hand, being so arranged that either collar moves inward (or toward the clutch member 66) when its associated gear is rotating with the shaft 10.

The collars 70 and 71 are counterbored at their inner ends and slidably receive respectively sleeves 74 and 75. These sleeves 74 and 75 are held in place in their associated collars 70 and 71 by means of split spring rings 76 which are received in annular grooves in the collars and which abut respectively against shoulders on the sleeves. A coil spring 77 acting between each collar and its associated sleeve tends to force the sleeve toward the clutch member 66, the action of each of the springs in this respect being limited by the split spring ring 76. On the inner end of the sleeve 74, there is provided an annular flange 78 having a diameter sufficient to insure its engagement with the adjacent end of the key 67. A similar flange 79 is provided on the sleeve 75.

The key 67 is normally held radially outward in the clutch member 66 in such a position that one of its ends will engage one of the springs 21 and 22. To hold the key 67 in this position and to prevent its accidental displacement from either of its end positions, we provide a roller 85 spring-pressed radially outward against the key 67. Desirably, the roller 85 is received in a notch in the key 67, such notch being provided at its ends with depressions which are separated by an intervening projection or land 86. The roller 85 cooperates with the two depressions to hold the key 67 in one or the other of its end positions, the key 67 being prevented from remaining in any intermediate position by the action of the roller 85 on the sloping sides of the projection 86.

The spring by means of which the roller 85 is forced outward against the key 67 may be of any construction desired, but we prefer to form it as a spiral spring 87 which is received within a deep groove in the clutch member 66 and has the roller 85 mounted on its outer end.

With the parts in the positions shown in Fig. 5, the key 67 projects outward to the left of the clutch member 66 and engages the free end of the clutch spring 22, the key being prevented from moving accidentally from such position by means of the roller 85 which is pressed by the spring 87 into the right-hand depression in the notch of the key 67. The shaft 10 is rotating in a counterclockwise direction as viewed from the right-hand end of the drive, and the spring 22 is operating to clutch the clutch-member 66 to the gear 13 so that such gear rotates with the shaft. The gear 12, being driven from the gear 13 through the pinion 14, rotates in the opposite direction. The two collars 70 and 71 are moving to the right due to the action of the screw-threads in the gears 12 and 13. By this rightward movement of the collar 71, the flange 79 eventually comes into engagement with the adjacent end of the key 67 and tends to force such key to the right. Movement of the key to the right, however, is opposed by the action of the spring 87 and roller 85 with the result that continued rightward movement of the collar compresses the associated spring 77. When the spring 77 becomes compressed to a point where the end of the sleeve 75 is engaged by the bottom of the recess in the collar 71, the key 67 is forced to the right out of engagement with the spring 22 and into engagement with the spring 21, the key being held in this position by engagement of the roller 85 in the left hand depression in the bottom of the notch of the key 67. The spring 77, which was compressed in the rightward movement of the collar 71, insures that the key will be moved to the right to the limit of its movement. Disengagement of the key from the spring 22 and its engagement with the spring 21 free the gear 13 from the shaft 10 and clutch the gear 12 to the clutch member 66 so that it will rotate with the driving shaft. This reverses the direction of rotation of both the gears 12 and 13 and causes the collars 70 and 71 to move to the left. Eventually the flange 79 on the sleeve 74 engages the adjacent end of the key 67 and forces such key to the left, thus reversing the drive again.

Desirably, some means is provided for effecting manual control of the drive in order that it may be rendered inoperative at will. To this end, the key 67 may be provided with a radial extension 90 which projects outward through the clutch member 66 and is provided with an inclined face which engages the complementarily inclined bottom of a groove in a collar 91 which is axially slidable on the clutch member 66. This collar 91 is provided in its outer surface with an annular groove which co-operates with a pivotal yoke 92 by means of which the collar may be shifted axially on the clutch member 66 to force the key 67 inwardly out of engagement with the free ends of both the springs 21 and 22. Desirably we provide the clutch member 66 with a pin 66' which is received within a groove or key-way in the collar 91 and prevents relative rotation of such collar and the clutch member 66.

For operating the yoke 92, we may provide an operating handle 93 rotatable with a shaft 94 to which is rigidly attached a collar 95 having an arm 96 connected to the yoke 92 by a link 97. The lever 93 may be operated to rock the shaft 94 to cause a shifting of the collar 91 on the clutch member 66. If desired, some means may be provided for holding the shaft 94 in either of its controlling positions. To accomplish this result, we may provide on the casing 65 a boss 100 which is provided radially of the shaft 94 with two grooves either one of which may receive a projection 101 on a collar 102 which rotates with the shaft 94 and is spring-pressed against the face of the boss 100 by means of a coil spring 103.

We claim as our invention:—

1. A reversing drive, comprising a rotatable driving shaft, two clutch members rotatable relatively to said shaft, a clutch member fixed on said shaft between said two rotatably mounted clutch members, said two rotatably mounted clutch members being provided in their faces adjacent said fixed clutch member with axial recesses, said fixed clutch member being provided in its end faces with axial recesses, a coil spring located in each of the recesses in said fixed clutch member and extending into the recess in the adjacent rotatably mounted clutch member, each of said springs being rotatable with its associated rotatably mounted member and having a diameter less than that of the recess in said fixed clutch member, means carried by said fixed member for engaging either of said springs, a driven shaft, means interconnecting said two rotatably mounted members with said driven shaft whereby it may be driven in opposite directions respectively by said two rotatably mounted members, and automatic means for periodically disconnecting said spring-engaging means from one of said springs and connecting it to the other.

2. A reversing drive, comprising a rotatable driving shaft, two clutch members rotatable relatively to said shaft, a clutch member fixed on said shaft between said two rotatably mounted clutch members, said fixed clutch member being provided in its end faces with axial recesses, a coil spring located in each of the recesses in said fixed clutch member, each of said springs being rotatable with its associated rotatably mounted member and having a diameter less than that of the recess in said fixed clutch member, means carried by said fixed member for engaging either of said springs, a driven shaft, means interconnecting said two rotatably mounted members with said driven shaft whereby it may be driven in opposite directions respectively by said two rotatably mounted members, and automatic means for periodically disconnecting said spring-engaging means from one of said springs and connecting it to the other.

3. A reversing drive, comprising a rotatable driving shaft, two clutch members rotatable relatively to said shaft, a clutch member fixed on said shaft between said two rotatably mounted clutch members, said fixed clutch member being provided in its end faces with axial recesses, a coil spring located in each of the recesses in said fixed clutch member, each of said springs being rotatable with its associated rotatably mounted member and having a diameter less than that of the recess in said fixed clutch member, means carried by said fixed member for engaging either of said springs, a driven shaft, means interconnecting said two rotatably mounted members with said driven shaft whereby it may be driven in opposite directions respectively by said two rotatably mounted members, and automatic means operated by one of said rotatably mounted members for periodically disconnecting said spring-engaging means from one of said springs and connecting it to the other.

4. A reversing drive embodying therein a driving shaft, a driven shaft disposed at a right angle thereto, oppositely facing gears on the driving shaft, a third gear on the driven shaft and meshing with said oppositely facing gears, a duplex clutch member positioned between said oppositely facing gears and rotative with the drive shaft and having oppositely facing recesses therein, a coil spring in each recess and operatively connected at one end to an associated oppositely facing gear, longitudinally reciprocable means carried by the clutch member for engaging and energizing one spring and then the other to clutch and declutch the associated oppositely facing gear to and from said clutch member and means operated in the rotation of the driving shaft for intermittently imparting reciprocating movement to said means carried by the clutch member.

In witness whereof, we have hereunto set our hands at Indianapolis, Indiana, this 9th day of June, A. D. one thousand nine hundred and twenty-seven.

WILLIAM CARLETON STARKEY.
DALMAR TEMPLETON BROWNLEE.